United States Patent [19]

Thomas et al.

[11] Patent Number: 4,464,626

[45] Date of Patent: Aug. 7, 1984

[54] MOUNTING STRUCTURE FOR DIAL AND POINTER ELECTRICAL INSTRUMENTS

[75] Inventors: David E. Thomas, Enfield; David M. Jeffrey, Wormley; David W. Simms, Bishops Stortford, all of England

[73] Assignee: Sangamo Weston Limited, Enfield, England

[21] Appl. No.: 296,044

[22] Filed: Aug. 25, 1981

[30] Foreign Application Priority Data

Aug. 29, 1980 [GB] United Kingdom ............. 8027945

[51] Int. Cl.³ ............................................. G01R 1/04
[52] U.S. Cl. ................................... 324/156; 324/153; 340/815.2; 340/815.12; 340/815.08; 361/371
[58] Field of Search .................. 324/153, 155, 154 PB, 324/156, 157, 114; 340/815.08, 815.09, 815.01, 815.2, 815.12; 116/300, 301; 361/369–372

[56] References Cited

U.S. PATENT DOCUMENTS

| | | |
|---|---|---|
| 2,750,585 | 6/1956 | Andersen et al. ............. 340/815.08 |
| 2,782,752 | 2/1957 | Dorn et al. ........................... 116/301 |
| 2,794,412 | 6/1957 | Rauth . |
| 3,521,945 | 7/1970 | Bristol et al. . |
| 3,603,779 | 9/1971 | Horne . |
| 3,612,851 | 10/1971 | Fowler . |
| 3,997,777 | 12/1976 | Pucciarello . |
| 4,176,546 | 12/1979 | Gibson et al. .................. 116/300 X |
| 4,258,317 | 5/1981 | Dubauskas ........................... 324/114 |
| 4,404,522 | 9/1983 | Pucciarello ...................... 334/156 X |

FOREIGN PATENT DOCUMENTS

| | | |
|---|---|---|
| 1188305 | 3/1965 | Fed. Rep. of Germany . |
| 2412737 | 7/1979 | France . |
| 643324 | 9/1950 | United Kingdom . |
| 715388 | 9/1954 | United Kingdom . |
| 681592 | 10/1957 | United Kingdom . |
| 1139645 | 1/1969 | United Kingdom . |
| 1348885 | 3/1974 | United Kingdom . |
| 1373216 | 11/1974 | United Kingdom . |
| 2023834 | 1/1980 | United Kingdom . |

Primary Examiner—Gerard R. Strecker
Assistant Examiner—Warren S. Edmonds
Attorney, Agent, or Firm—Dale Gaudier

[57] ABSTRACT

In order to allow a wide range of instruments to be assembled from standard modules, there is provided a range of different diameter housings with their glasses spun in and sealed by an O-ring. A housing can be trimmed to length as required. Different types of panel mountings can be fixed over the front rim of the housing. One of a range of standard movements is mounted between plates and matched to the housing diameter and retained therein by releasable catches. The catches may be turnbuttons cooperating with pegs projecting inside the housing. Alternatively, leaf spring catches slidable radially outwardly on the plate can engage in an annular groove inside the housing and be locked in position by clamp screws. The rear end of the housing is plugged by an O-ring sealed base which carries either a terminal part/connector structure only or also a range scaling circuit enabling the same movement to handle different input signal ranges. The pointer on an offset arm sweeps over a scale which can be hub lit. For small instruments where cylindrical space available radially inside the arm is small, bulbs are mounted in a radially offset position (where the needle does not sweep) of a transparent body to direct light radially inwardly to a 45° surface where internal reflection directs the light axially along a cylindrical lens part from which the light diffuses radially over the scale. Alternatively, the 45° surface can be omitted by locating the bulbs close to the axis in a recess through which the bulbs can be withdrawn in the radial direction.

14 Claims, 10 Drawing Figures

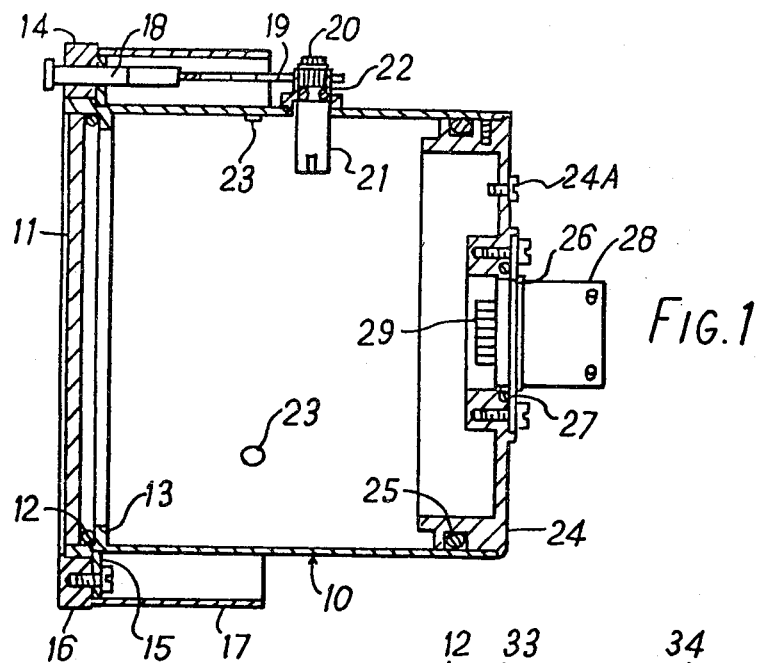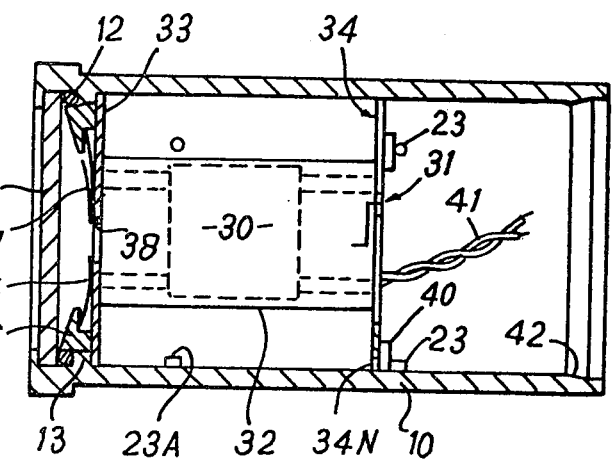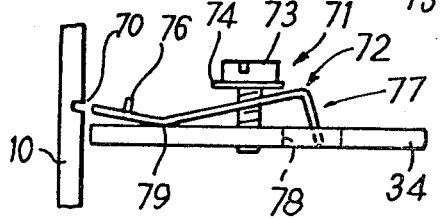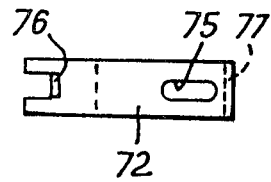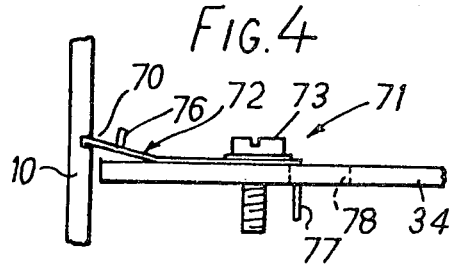

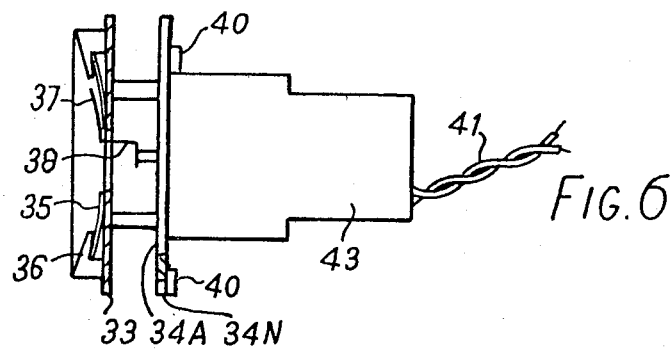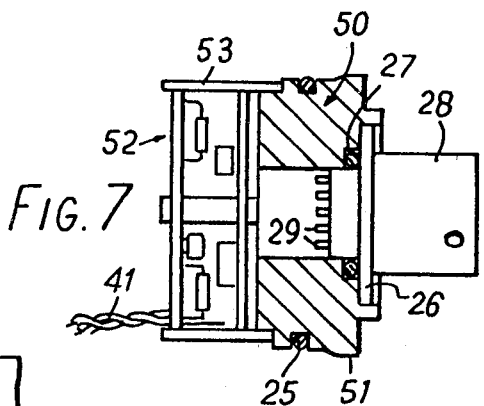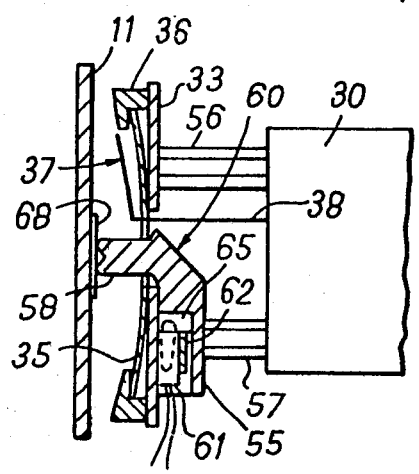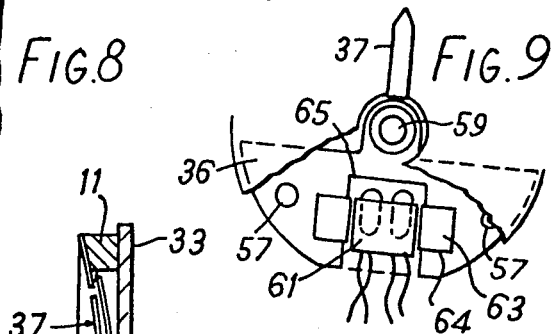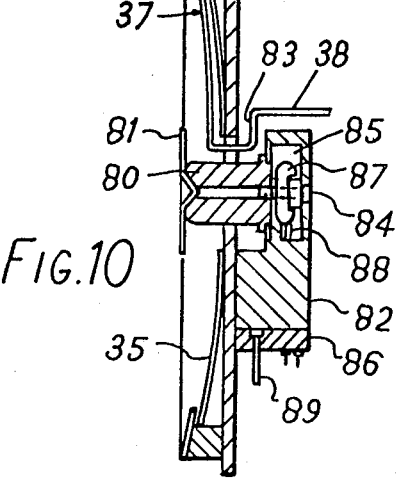

MOUNTING STRUCTURE FOR DIAL AND POINTER ELECTRICAL INSTRUMENTS

BACKGROUND OF THE INVENTION

The present invention relates to a dial and pointer electrical instrument comprising a movement, carrying a pointer, and a scale in a cylindrical housing closed at one end by a glass through which the pointer is read against the scale and closed at the other end by a base carrying terminal structure which electrical connection from outside the housing to the movement inside the housing is effected, the movement being attached to a mounting structure which positions the movement inside the cylindrical housing and being retained therein by fixing devices cooperating with the housing, without mechanical attachment of the movement to the base. The word "glass" is used for convenience without regard for the material thereof. Such instruments are used, for example, as indicators in aircraft. The invention is concerned with the problem of being able to meet a range of requirements with economical stocking of standard parts, also with improved hub lighting arrangements suitable for small size instruments, and also with an improved means for mounting the glass of the instrument.

"Size" herein refers to cross-sectional dimensions, i.e. diameter for the typical case of a circular cylindrical housing. In a range of instruments it will typically be necessary to provide several different sizes; for each size different depths of housing may be required, different types of movement may be required and it may be necessary to incorporate a signal conditioning circuit, e.g. a circuit which scales the input electrical signal to the input signal to the movement. It is also commonly necessary to make the housing airtight so that it can be sealed with a fill of an inert gas, especially for use in aircraft.

PRIOR ART

In a typical known instrument, e.g. as described in GB PS No. 1,567,470, the movement is pillar mounted on a base which forms a plug in the back end of a cylindrical housing. With such a structure it is inconvenient to accommodate different movements and different housing depths and to accommodate (or not) different types of conditioning circuits. It should be noted that is is particularly desirable to be able to incorporate signal conditioning circuits as they make it possible to use the same movement for different input signal ranges, i.e. it is not necessary to build a range of movements differing in the number of coil turns, to take the example of a moving coil instrument.

An instrument as set out in the first paragraph above is known from GB PS 1 330 959. However, in the known instrument the housing is in two halves which telescope over an adapter ring to which both housing halves are fixed by screws. The movement has a solid base which fits inside the adapter ring and is retained by a further set of screws. The axial position of the adapter ring is fixed by the lengths of the housing halves and the known instrument does not provide any means for conveniently accepting movements of different kinds and depths.

In known instruments which have to be gas-tight the glass is commonly sealed and retained by an adhesive or solder. It is difficult to ensure a satisfactory seal and prevent excess sealant contaminating the glass or other parts of the instrument.

Known hub lighted instruments comprise lamps clustered inside an annular lens covered with a mask. The light radiates through the lens in all directions across the scale. The pointer is attached to an arm which passes from the movement through an annular gap between the lamp housing and the scale. It has proved to be impossible to use this construction with smaller size instruments, e.g. with a housing diameter less than 40 mm.

In the instrument according to the invention the movement is attached to a mounting structure which positions the movement inside the cylindrical housing and comprises at least a back plate. The mounting structure can also comprise a front plate which abuts an internal shoulder in the housing. The back plate carries a plurality of catches each of which engages releasably with cooperating structure inside the housing to prevent axial displacement of the movement. The movement is thus retained without attachment to the base which closes the end of the housing opposite to the glass. In the preferred embodiment the cooperating structure is an internal annular groove and the catches are slid out radially to engage in this groove. The catches may be leaf springs which additionally bias the movement resiliently towards the glass so as to prevent vibration. Alternatively the catches can be turnbuttons rotatably mounted on the back plate and the cooperating structure can comprise pegs projecting inside the housing so that each turnbutton engages under a corresponding peg.

The glass is not bonded into the housing but is retained purely mechanically, e.g. by spinning a retaining lip over the margin of the glass. In order to make this structure gas-tight, an O-ring seals the glass relative to the housing.

The scale is hub lit by means of a transparent body or assembly of parts comprising a cylindrical lens part projecting through the scale and a bulb housing behind the scale. In order to accommodate the bulbs satisfactorily within the confines of a small diameter instrument while providing ready access thereto for changing burned out bulbs, one of two alternative constructions is employed. In the first alternative the bulbs are housed off the axis of the cylindrical lens part. The transparent body has an oblique, internally reflecting face and light from the bulb passes radially inwardly to this face, whereat the light is reflected axially along the lens part. The light is defused radially outwardly at the front end of the lens part which may be formed with a conical, internally reflective depression to assist in this respect.

In the second alternative the bulbs are housed adjacent the axis of the cylindrical lens part, one on either side of this axis, but they are housed in a recess extending radially into the bulb housing. Accordingly, after withdrawing the movement from the cylindrical housing of the instrument, the bulbs can be withdrawn radially for replacement.

It is accordingly a broad object of this invention to provide a dial and pointer electrical instrument with an improved mounting of the movement without attachment of the movement to the base of the instrument.

It is a more specific object to provide an instrument wherein the movement is retained by means allowing easy withdrawal of the movement from the base end of the housing of the instrument.

It is a further object of the invention to provide an improved dial and pointer electrical instrument with a glass which is sealed into one end of the housing of the instrument in a gas-tight manner, without the use of a sealing adhesive.

It is a still further object of the invention to provide a dial and pointer electrical instrument with an improved hub lighting means.

BRIEF DESCRIPTION OF THE DRAWINGS

The invention will be described in more detail, by way of example, with reference to the accompanying drawings in which:

FIG. 1 is a longitudinal cross-section of the housing of an instrument, including a base used when no conditioning circuit is required, FIG. 2 is a like view of a housing, minus base but with the movement therein, FIGS. 3 and 4 illustrate an alternative, preferred form of catch disengaged and engaged respectively, FIG. 5 is a plan view of a spring used in the catch of FIGS. 3 and 4, FIG. 6 is an elevation of an alternative movement for fitting in the housing, FIG. 7 is an elevation of a base with a conditioning circuit thereon, FIG. 8 is a cross-section of a hub lighting arrangement for an instrument, FIG. 9 is a fragmentary face view of this arrangement, and FIG. 10 is a cross-section of an alternative hub lighting arrangement.

DESCRIPTION OF THE PREFERRED EMBODIMENTS

In the embodiment of the invention chosen for illustration, it is assumed that the manufacturer has to cater for four housing sizes, three different movement types, different front panel mountings (e.g. those known in the art as ARINC, MS and DF), different housing depths and either straight terminal feed-through, but with different external connections, or incorporation of various signal conditioning circuits. Two of the movements are moving coil movements differing in magnetic volume; the third is a servo movement.

Referring to FIG. 1, there are four different size cylindrical housings 10 all made to maximum length for trimming to the required depth for a given instrument. Each housing is an impact extrusion of aluminium and is complete with a glass 11 which is spun into the housing against an O-ring 12 backed by an internal flange 13. This provides a seal round the glass in a reliable and less messy way than the conventional use of solder or adhesive sealant. For each housing size there is provided the required range of panel mounting 14 which simply slip over the front end of the housing and are fixed e.g. by a clamp ring 15 screwed on to the back of the mounting and bearing against an external shoulder on the housing. The illustrated mounting comprises an integral bezel 16 and skirt 17 for fitting into the mounting hole in an instrument panel. Also this mounting has a push button plunger 18 for actuating a test mechanism of the movement via a rack 19 on the plunger and a pinion 20 on a stub shaft 21 sealed through the housing 10 by an O-ring 22.

A standard ARINC mounting has an octagonal bezel 16 and requires an octagonal section skirt 17 for fitting into an ARINC panel aperture which is also of octagonal shape with four longer edges alternating with shorter corner edges at 45° to the longer edges. In order to avoid the expense of making a bezel with an integral octagonal skirt, particularly for short production runs, an alternative form of mounting 14 can be employed. This comprises a machined bezel 16 and four extruded bars which are welded on to the outside of the housing 10 at 90° intervals, extending parallel to the axis of the housing. The inner faces of the bars are concave to match the periphery of the housing. The outer faces are flat and conform to the shorter, corner edges of the ARINC panel aperture. The bezel 16 is attached to the front ends of the bars by screws passing through the bezel into threaded holes in the ends of the bars. The mounting structure is slid in from the front of the panel in conventional way and retained by a standard ARINC clamp band tightened around the bars behind the panel. The bezel carries the plunger 18 as in FIG. 1.

Inside the housing 10 is at least one ring of three internal pegs 23 whose purpose will be explained below.

The rear of the housing is plugged by a base 24 sealed by an O-ring 25. An exhaust screw 24A allows the housing to be evacuated and then filled with nitrogen, for example. A connector mounting plate 26 is screwed over a central aperture in the base and sealed by an O-ring 27. Different types of connector 28 (plug-in type, terminal part type) can be brazed into the plate 26 and have internal pins 29 to which the leads to the movement are connected during assembly.

FIG. 2 shows a housing 10 with a schematically represented moving coil movement 30, including a zero-adjust lever 31, mounted inside a magnetic shield 32 between front and rear end plates 33 and 34. The same movements can be used with different diameter plates 33 and 34 matched to the different housing sizes. The plates are a sliding fit inside the housing and thus position the movement transversely therein. The plates have notches 34N to clear the pegs 23. The front plate 33 is the back plate for a scale 35 with a bezel ring 36 giving a so-called stepped scale, i.e. the outer part of the scale on the ring 36 is level with the pointer 37 which projects on an arm 38 from the movement.

The back plate 34 is used to fix the movement inside the housing with the front plate 33 butting against the internal flange 13. To this end the back plate carries three catches 40 adjacent the notches 34N and which can be rotated (e.g. by a screwdriver or Allen key) to lodge under the pegs 23. In one embodiment the catches are miniature turn-button catches with shallow recesses in which the pegs 23 lodge when the catches are fully engaged. This provides detent action to prevent accidental undoing of the catches, e.g. under the influence of aircraft vibration. Various forms of catch may be used, cooperating with pegs of other projections or with recesses or an annular groove in the housing 10.

An embodiment using an annular groove is illustrated in FIG. 3 of the drawings. This shows in fragmentary manner a portion of the housing 10 with an interior annular groove 70 which extends round the whole circumference of the housing at the same axial position as the pegs 23 of FIG. 1. Such a groove is simple to machine. The back plate 34 (FIG. 3) carries a plurality, say three or four, of catches 71 equally spaced round it periphery. Each catch (FIGS. 3, 4 and 5) comprises a radially extending leaf spring clip 72 retained by a screw 73 (with washer 74) extending through a slot 75 in the spring clip. The slot allows the spring clip to be slid radially out from a disengaged position (FIG. 3) to an engaged position (FIG. 4) in which the end of the clip engages in the groove 70, irrespective of the orientation of the plate 34 about the axis of the housing 10. To facilitate movement of the clip, it has a bent up tab 76 which can be engaged by a screwdriver. The spring clip also has a bent down tab, e.g. (as illustrated) the tail 77 of the spring, which slides in a radial slot 78 in the back plate 34 and keeps the spring clip aligned in the radial direction.

After the clip has been engaged (FIG. 4), the screw 73 is tightened up to lock the clip in place. The spring clip 72 has a bend part way along its length acting as a fulcrum 79 (FIG. 3) such that, when the screw 73 is tightened, the end of the clip in the groove 70 is biased away from the back plate 34 and urges the movement axially against the internal flange 13 (FIG. 2) for vibration-free mounting of the movement.

An additional advantage of the embodiments of the invention over conventional pillar mounting on the base, which is a cantilever type of structure allowing vibrational modes of the movement, is that the movement is laterally as well as axially positioned and fully supported in the housing. This will apply whether the plates 33 and 34 are full plates or have cut-outs or are merely spiders with the catches at the ends of the arms thereof.

The base to which the movement leads 41 are connected is not shown in FIG. 2. The rear end of the housing 10 may be plain as in FIG. 1 or lightly counterbored as at 42 in FIG. 2.

FIG. 2 also shows a second row of pegs 23A. These are for fixing an alternative, servo movement 43, FIG. 6, with a back plate 34A spaced much nearer the front plate 33. For the embodiment of FIG. 3, a second annular groove is machined at the position of the pegs 23A of FIG. 2.

Instead of the plain base 24 of FIG. 1, a base 50 such as is shown in FIG. 7 may be employed. This example comprises a main body ring 51 with provision for the O-rings 25 and 27 and the connector plate 26 as in FIG. 1. The ring 51 is profiled for use with the counter-bored housing 10 of FIG. 2. In addition the ring carries an internal conditioning circuit 52 within a support sleeve 53, e.g. for scaling on linearizing the signal applied to the movement via the leads 41. Different circuits in sleeves 53 can be slipped on to the one ring 51, with appropriate connections (not shown) to the pins 29.

The cylindrical volume swept out by the arm 38 (FIGS. 2 and 6) regarded as a generator can, if the radial distances to the arm is great enough, serve to accommodate a conventional hub lighting unit, although this is not shown in either Figure. In smaller size instruments there will be insufficient space for a conventional unit and the arrangement shown in FIGS. 8 and 9 or the arrangement shown in FIG. 10 can then be employed.

In FIGS. 8 and 9, a one-piece transparent plastics body comprises a segment 55 in that sector of the instrument outside the range of movement of the pointer, between the movement 30 proper and the front plate 33 which is attached to the movement by typical screw-pillar mountings 56 and 57. Over the segment 55, shorter pillars 57 are employed. If no hub lighting is required, all pillars are the larger pillars 56.

The plastics body moreover comprises a central axially directed, cylindrical lens part 58, with a conical depression 59 in its end, and a prism part formed by a 45° face 60. The segment 55 has a recess 65 housing two encapsulated miniature bulbs 61 which are trapped under a yoke 62 whose lugs 63 are in turn trapped in shallower recesses 64 in the segment 55.

Light from the bulbs is directed generally radially inwardly into the plastics body, internally reflected axially outwards by the face 60, internally reflected in all radial directions by the conical depression 59 and diffused over the scale 35, 36 by the cylindrical lens part 58. The stepped scale has an advantage with this construction in that, because the pointer 37 and bezel surfaces 36 are level, there can be no shadow of the pointer on index markings on this part of the scale.

A mask 68 over the lens part 58, to prevent the observer seeing a bright patch in the centre of the dial, is conveniently formed by a matt black patch deposited inside the glass 11 or as described below for FIG. 10. The scale 35 is typically also matt black. The plastics body 55, 58 may be a polycarbonate or polymethylmethacrylate, for example.

In the arrangement shown in FIG. 10, cylindrical lens 80 is formed like the lens part 58 of FIG. 8. A mask is formed by an opaque disc 81 bonded to the front end of the lens, the disc having a conically dished centre filling into the conical depression in the end of the lens. The lens is held by a screw 84 in a front aperture of a generally radial bulb housing 82 of plastics material fixed to the rear face of the front plate 33 in the zone clear of the movement of the pointer arm 38. This arm is cranked at 83 to clear the inner end of the housing 82 while extending nearer to the axis of the movement where it passes through the central hole in the plate 33. Accordingly, the inner end of the pointer 37 itself is nearer the axis than the part of the arm 38 which passes the inner end of the bulb housing.

The bulb housing 82 has a generally radial bulb recess 85 into which plugs a bulb carrier 86 carrying two bulbs 87 flanking the screw 84 which lies on the movement axis. Since the bulbs are close to the axis, the reflecting surface 60 employed in FIG. 5 is not needed. The bulb leads 88 pass through the carrier 86 which can be pulled out of the housing 82, with the two bulbs 87, in the radial direction. A pin 89 in the carrier 86 can be gripped by pliers to facilitate this.

In known arrangements, the bulbs near the axis are removed in the axial direction which requires substantially more disassembly than in the arrangement of FIG. 10. In FIG. 10 it is merely necessary to withdraw the movement from the housing 10 after undoing the catches 40 or 71 and then the bulb holder and bulbs can be pulled out radially for replacement without any further disassembly.

We claim:

1. A dial and pointer electrical instrument comprising a cylindrical housing, a movement having a pointer secured thereto, and a scale mounted in said cylindrical housing, a glass through which the pointer is read against the scale closing one end of the housing, a base closing the other end of the housing and carrying terminal structure through which electrical connection from outside the housing to said movement inside the housing is effected, said movement being attached to a mounting structure which positions said movement inside said cylindrical housing, said mounting structure comprising a plate which is a sliding fit inside said housing and carries a plurality of catches, each catch engaging releasably with cooperating structure inside said housing to prevent axial displacement of the movement and to retain said movement without mechanical attachment of said movement to said base.

2. An instrument according to claim 1, wherein said cylindrical housing is a circular cylindrical housing, and the catches are engageable in a plurality of different orientations of said movement about the cylinder axis.

3. An instrument according to claim 1, wherein said cooperating structure comprises at least one internal annular groove and said catches are engageable in said groove.

4. An instrument according to claim 3, wherein each catch is a radially slidable leaf spring held by a screw for tightening the spring on to the plate and bent so that, when it is engaged in said groove and said screw is tightened, the spring creates a force resiliently urging said movement towards said glass.

5. An instrument according to claim 1, wherein each catch is a turnbutton rotatably mounted on said plate.

6. An instrument according to claim 5, wherein each turnbutton engages under a corresponding peg projecting inside said housing, the pegs forming said cooperating structure.

7. An instrument according to claim 1, wherein said mounting structure comprises front and rear plates of which said front plate abuts an internal shoulder in the housing while said rear plate is said plate carrying said catches.

8. An instrument according to claim 1, wherein said base plugs the end of said housing and is sealed by an O-ring seal.

9. An instrument according to claim 1, wherein said base has an aperture covered by a plate which is sealed by an O-ring and carries said terminal structure.

10. An instrument according to claim 1, further comprising a signal conditioning circuit mounted inside said housing on said base and connected electrically between said terminal structure and said movement.

11. An instrument according to claim 1, further comprising means mechanically retaining said glass in said housing, and an O-ring sealing said glass in said housing.

12. An instrument according to claim 11, further comprising a panel mounting structure fitted over and retained on said housing.

13. An instrument according to claim 1, further including hub lighting means for said scale comprising a transparent body, said transparent body having a cylindrical lens part projecting through said scale and a bulb housing part associated with said lens part, and at least one bulb housed in said bulb housing directing light into said lens part.

14. A dial and pointer electrical instrument comprising a cylindrical housing, a movement having a pointer secured thereto, and a scale mounted in said cylindrical housing, a glass closing one end of said housing for reading the pointer against the scale, said glass being retained mechanically in said housing, an O-ring seal forming a gas-tight seal between said glass and said housing, a base closing the other end of said housing and carrying terminal structure effecting electrical connection from outside said housing to said movement inside said housing, a mounting structure positioning said movement inside said housing, said mounting structure comprising front and rear plates, hub lighting means for said scale comprising a transparent body, said transparent body having a cylindrical lens part projecting through said scale and a bulb housing part disposed behind said front plate, at least one bulb housed in said bulb housing for directing light into said lens part, said rear plate being a sliding fit inside said cylindrical housing and said rear plate carrying a plurality of catches, each catch engaging releasably with cooperating structure inside said housing to prevent axial displacement of said movement and to retain said movement without attachment of said movement to said base.

* * * * *